(12) United States Patent
Owen et al.

(10) Patent No.: US 8,310,446 B1
(45) Date of Patent: Nov. 13, 2012

(54) SYSTEM FOR INTEGRATED COARSE AND FINE GRAPHICAL OBJECT POSITIONING

(75) Inventors: Gary L. Owen, Robins, IA (US); Maureen A. Lehman, Cedar Rapids, IA (US); Michael J. Krenz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 752 days.

(21) Appl. No.: 11/510,543

(22) Filed: Aug. 25, 2006

(51) Int. Cl.
*G06F 3/033* (2006.01)
*G09G 5/08* (2006.01)
*G09G 5/00* (2006.01)

(52) U.S. Cl. .......................... 345/157; 345/159; 345/184

(58) Field of Classification Search .......... 345/156–167, 345/184
See application file for complete search history.

(56) References Cited

U.S. PATENT DOCUMENTS

| | | | | |
|---|---|---|---|---|
| 4,680,577 A * | 7/1987 | Straayer et al. | ............... | 345/160 |
| 4,698,626 A * | 10/1987 | Sato et al. | ...................... | 345/166 |
| 4,719,455 A * | 1/1988 | Louis | ............................. | 345/184 |
| 4,816,810 A * | 3/1989 | Moore | .......................... | 345/163 |
| 4,891,632 A * | 1/1990 | Chang | ............................. | 345/165 |
| 5,315,392 A * | 5/1994 | Ishikawa et al. | ................ | 725/56 |
| 5,760,763 A | 6/1998 | Ainsburg | | |
| 5,905,497 A | 5/1999 | Vaughan et al. | | |
| 5,910,798 A * | 6/1999 | Kim | ............................... | 345/163 |
| 5,995,901 A * | 11/1999 | Owen et al. | ................... | 701/528 |
| 6,052,115 A | 4/2000 | Gregg et al. | | |
| 6,057,826 A | 5/2000 | Gaultier et al. | | |
| 6,100,875 A * | 8/2000 | Goodman et al. | ............ | 345/163 |
| 6,128,553 A * | 10/2000 | Gordon et al. | ..................... | 701/3 |
| 6,172,428 B1 * | 1/2001 | Jordan | ......................... | 290/40 C |
| 6,181,325 B1 * | 1/2001 | Lee | ................................ | 345/157 |
| 6,396,477 B1 * | 5/2002 | Hinckley et al. | .............. | 345/163 |
| 6,452,587 B1 * | 9/2002 | Nikom | ........................... | 345/167 |
| 6,466,235 B1 * | 10/2002 | Smith et al. | .................... | 715/771 |
| 6,489,948 B1 * | 12/2002 | Lau | ................................ | 345/163 |
| 6,545,666 B1 * | 4/2003 | Culler | ........................... | 345/168 |
| 6,571,171 B1 * | 5/2003 | Pauly | ............................ | 701/528 |
| 6,636,198 B1 * | 10/2003 | Gross et al. | ................... | 345/157 |
| 6,654,002 B1 * | 11/2003 | Yamaki | ......................... | 345/157 |
| 6,795,055 B1 | 9/2004 | Culler | | |
| 6,799,095 B1 * | 9/2004 | Owen et al. | ....................... | 701/4 |
| 6,903,720 B1 * | 6/2005 | Glithero | ........................ | 345/156 |
| 7,433,779 B2 * | 10/2008 | Deker et al. | .................. | 701/122 |
| 7,545,362 B2 * | 6/2009 | Kong | ............................. | 345/158 |
| 7,557,797 B2 * | 7/2009 | Ludwig | ......................... | 345/163 |
| 7,576,726 B2 * | 8/2009 | Harley et al. | ................. | 345/157 |
| 2002/0093483 A1 * | 7/2002 | Kaplan | ......................... | 345/158 |
| 2004/0017355 A1 * | 1/2004 | Shim | ............................ | 345/157 |

(Continued)

*Primary Examiner* — Bipin Shalwala
*Assistant Examiner* — Keith Crawley
(74) *Attorney, Agent, or Firm* — Donna P. Suchy; Daniel M. Barbieri (57) ABSTRACT

A system for positioning a graphical object on an electronic display. A coarse positioning input control element provides a coarse position input signal and a fine positioning input control element provides a fine position input signal. A microprocessor is operatively connected to the coarse positioning input control element and the fine positioning input control element for integrating the coarse position input signal and the fine position input signal. The microprocessor output signal is provided to an electronic display. Manipulation of the coarse positioning input control element provides a rapid and coarse manual positioning of a graphical object and manipulation of the fine positioning input control element provides accurate positioning of the graphical object, thereby optimizing the efficiency for graphical object positioning on the electronic display.

10 Claims, 9 Drawing Sheets

U.S. PATENT DOCUMENTS

| | | |
|---|---|---|
| 2004/0021694 A1* | 2/2004 | Doar .............................. 345/784 |
| 2004/0155865 A1* | 8/2004 | Swiader ........................ 345/161 |
| 2004/0201726 A1* | 10/2004 | Bloom et al. ............... 348/223.1 |
| 2004/0207637 A1* | 10/2004 | Pauly et al. ................... 345/619 |
| 2005/0009571 A1* | 1/2005 | Chiam et al. .................. 455/566 |
| 2005/0057489 A1* | 3/2005 | Kung et al. .................... 345/156 |
| 2006/0038775 A1* | 2/2006 | Agata et al. ................... 345/156 |
| 2006/0267934 A1* | 11/2006 | Harley et al. ................. 345/157 |
| 2007/0123204 A1* | 5/2007 | Inukai ........................... 455/403 |
| 2010/0001961 A1* | 1/2010 | Dieterle et al. ............... 345/173 |

* cited by examiner

SYSTEM FOR INTEGRATED COARSE AND FINE GRAPHICAL OBJECT POSITIONING

BACKGROUND OF THE INVENTION

1. Field of the Invention

The present invention relates generally to graphical object positioning on electronic displays, and more particularly to a system for integrating coarse and fine graphical object positioning on an electronic display.

2. Description of the Related Art

Electronic flight display systems, which provide a means for the pilot to manually position graphical objects, can be labor intensive and cause high workload to use in cases where positioning the object at the desired display location has to be relatively accurate. Existing designs use one of two types of positional control devices (i.e. elements) to accomplish this task.

Some of these designs use control devices such as a joystick, trackball or touchpad which provide for rapid movement of the graphical object. This allows for coarse but quick traversal of the graphical object over long lengths on the display. However, these designs are highly inefficient for fine placement on the display since priority is given to rapid movement rather than positional accuracy. The time gained by the quick traversal is lost when trying to position the graphical object by small amounts to reach the desired location on the display. This situation can be compromised even further when performing this task during turbulent flight conditions.

Other existing designs use a different type of control device such as a rotary knob or scroll wheel with detents that provides for small uniform incremental movements of the graphical object. This allows for fine placement of the graphical object over short lengths on the display. However, these designs are highly inefficient for coarse but quick traversal over long lengths on the display since priority is given to positional accuracy rather than rapid movement. The time gained by accurately positioning the graphical object by small amounts is lost when a long length needs to be traversed to reach the desired location on the display. Like the prior control devices described above, this situation can be compromised even further when performing this task during turbulent flight conditions.

U.S. Pat. No. 6,795,055, issued to J. H. Culler, entitled "Devices, Systems and Methods for Facilitating Positioning of Cursor On Display Device," discloses an input device which includes a shifter configured to electrically communicate with a computer. The shifter is configured to enable functional information, provided by a mouse-type input device, to provide selected functionality of the cursor. The shifter provides a shift-disable mode and a shift-enable mode so that, while in the shift-disable mode, the shifter enables the mouse-type input device to influence movement of the cursor on the display device. For instance, a movement of the mouse-type input device in a first direction and a first distance results in the cursor moving the first direction and a corresponding second distance. In the shift-enable mode, the shifter enables an altering of movement of the cursor so that movement of the mouse-type input device in the first direction and the first distance results in the cursor moving the first direction and a corresponding third distance, with the third distance being unequal to the second distance. This device is also disclosed in U.S. Pat. No. 6,545,666, of the same applicant. Both of the above-mentioned patents involve utilizing one device that operates in different modes. The device has two fixed gains. In the shift-disable mode the normal gain typical of a mouse is utilized to translate device motion to on screen cursor motion. In the shift-enable mode, the gains are changed enabling fine positioning. That is, in shift-enable mode, the gains are decreased resulting in larger device motion for smaller on screen cursor motion, thereby enabling fine positioning of the on screen cursor.

U.S. Pat. No. 6,181,325, issued to K. Lee, entitled "Computer System with Precise Control of the Mouse Pointer," discloses a portable computer system that enables locating the mouse pointer precisely on the monitor screen. The computer system includes a pointing device such as a touch pad mounted at top surface of the main body with two mouse buttons. A button is provided at left sides of the touch pad. This button is similar to the mouse button and used when fine adjustment of the mouse pointer is needed. The operation of the fine adjustment mode performed in the computer is as follows: determining whether a fine adjustment mode selection key is pressed; zooming in a predetermined screen area including current location of the pointer based on the corresponding video driver and operating system; locating the pointer at the desired position within the zoom in screen; checking if the fine adjustment mode has canceled; and restoring the zoom in screen to original picture if the fine adjustment mode is canceled. The cancellation of the fine adjustment mode is performed by detecting the signal fed from one of the mouse buttons. To enable fine positioning of the cursor, the magnification of the on screen display area is increased with the gain of the device being held constant. This has the effect of decreasing the gain of the device, thereby enabling fine on screen cursor positioning.

SUMMARY OF THE INVENTION

In a broad aspect, the present invention is a system for positioning a graphical object on an electronic display. A coarse positioning input control element provides a coarse position input signal and a fine positioning input control element provides a fine position input signal. A microprocessor is operatively connected to the coarse positioning input control element and the fine positioning input control element for integrating the coarse position input signal and the fine position input signal. The microprocessor output signal is provided to an electronic display. Manipulation of the coarse positioning input control element provides a rapid and coarse manual positioning of a graphical object and manipulation of the fine positioning input control element provides accurate positioning of the graphical object, thereby optimizing the efficiency for graphical object positioning on the electronic display.

Thus, the present invention integrates the use of two dissimilar positional control elements which can be used interchangeably to perform the graphical object positioning task on an electronic flight display. The coarse positioning input control element provides a rapid means to manually position the graphical object on the display. This device is used to the extent needed by the operator to rapidly move the graphical object long distances on the display. The fine positioning input control element is then used to manually position the graphical object over small distances very accurately on the display. The innovation thereby provides a means to minimize the overall amount of time required by the operator to accurately position the graphical object anywhere on the electronic display regardless of how far the object must be moved to accomplish the task.

This is particularly advantageous for application with an avionics system in which turbulent flight conditions may exist. It provides the capability of providing flight plan edits using graphical flight planning operations which require accurate yet efficient cursor movement.

Another advantage of this invention is that it inherently provides a backup cursor positioning capability in the event that either of the two cursor control devices (coarse or fine) fails. Although suboptimal, this could be a significant advantage if both the coarse and fine positioning controls are dual axis.

DETAILED DESCRIPTION OF THE INVENTION

Figure 1:
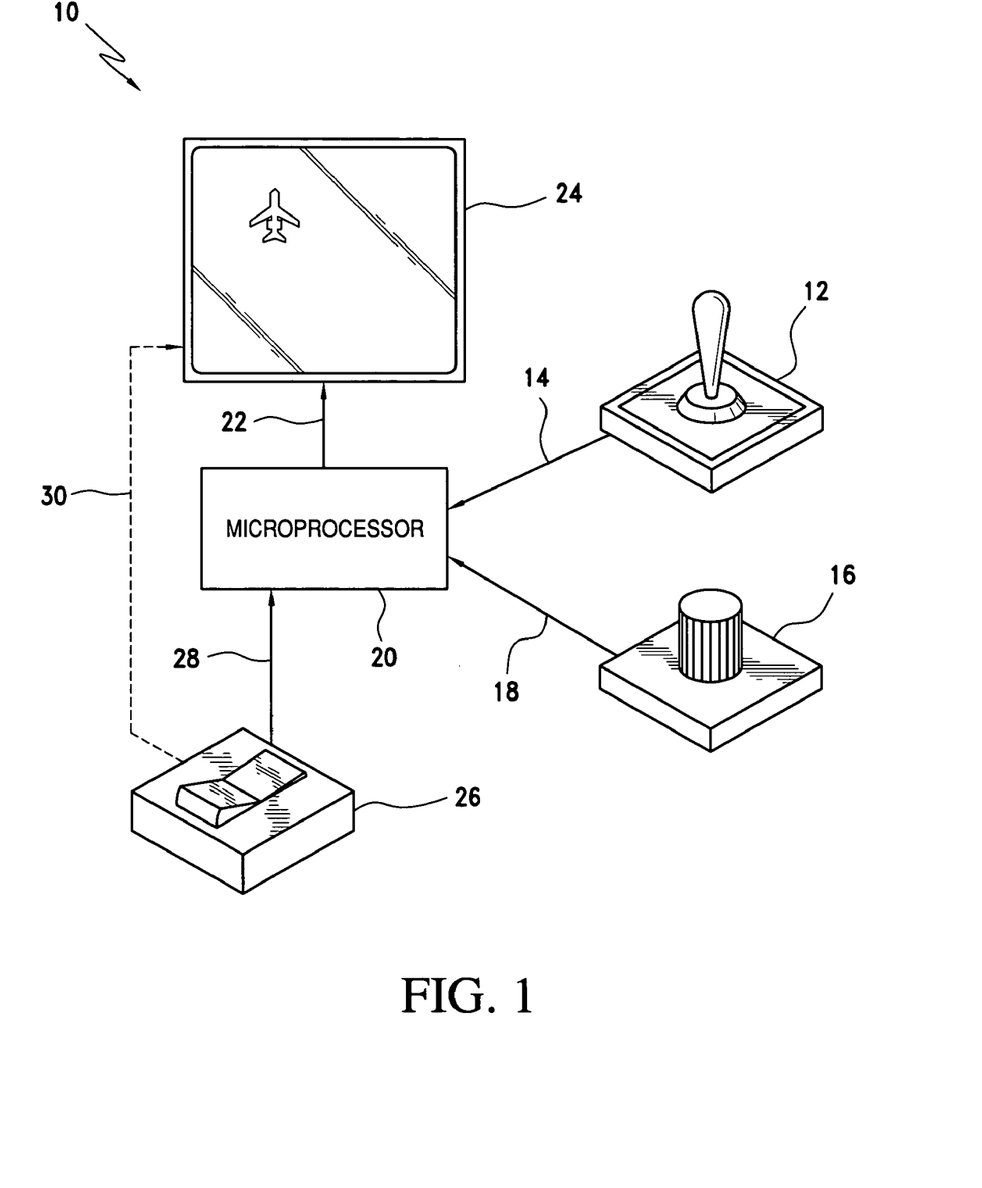
FIG. 1 is a block diagram of the system for positioning a graphical object of the present invention.

Referring now to the drawings and the characters of reference marked thereon, FIG. 1 illustrates a system for positioning a graphical object in accordance with the principles of the present invention, designated generally as 10. A coarse positioning input control element 12 provides a coarse position input signal 14. The coarse positioning input control element may be, for example, a joystick, trackball, touch pad, or mouse. A fine positioning input control element 16 provides a fine position input signal 18. Either the coarse and fine control elements 12, 16 can either be single-axis or dual-axis type controls. Single-axis type controls allow for graphical object positioning in only one direction at a time which may be limited to horizontal, vertical or diagonal in nature. Examples of single-axis controls include a scroll wheel, rotary knob and unidirectional touchpad. Dual-axis type controls allow for graphical object positioning in two directions at a time thereby facilitating X-Y placement in one operation. A joystick, trackball, touchpad, computer mouse and dual-stacked rotary knob are all examples of dual-axis type positional controls. Thus, preferred examples of the fine positioning input control element may be, for example, a rotary knob, scroll wheel, rocker switch, or pushbutton.

A microprocessor 20 is operatively connected to the coarse positioning input control element 12 and the fine positioning input control element 16 for integrating the coarse position input signal 14 and the fine position input signal 18. The microprocessor output signal 22 is provided to an electronic display 24. The microprocessor 20 may be, for example, any digital computer processor on a microchip which is capable of performing arithmetic and logic operations to handle the coarse/fine element inputs and output to the electronic display.

A control switch 26 is preferably operatively connected to the microprocessor 20 (as shown by numeral designation 28) for engaging a graphical object positioning mode. The coarse positioning input control element and the fine positioning input control element can be used to interchangeably position the graphical object. The control switch 26 is also preferably also capable of disengaging the graphical object positioning mode. The control switch may be, for example, a pushbutton, toggle switch, rocker switch, etc.—i.e. a type of input device which provides a momentary or static control of selecting two states (i.e., On and Off states).

Alternatively, the control switch 26 may be directly coupled to the electronic display 24, as shown in phantom by numeral designation 30. The coupling of the control switch to the microprocessor or directly to the electronic display depends on whether the logic for engagement/disengagement of the graphical object positioning mode resides in the microprocessor or electronic display, respectively. The coarse positioning input control element 12, fine positioning input control element 16 and control switch 26 may be located on a single device, or located on separate devices as shown in FIG. 1.

Figure 2:
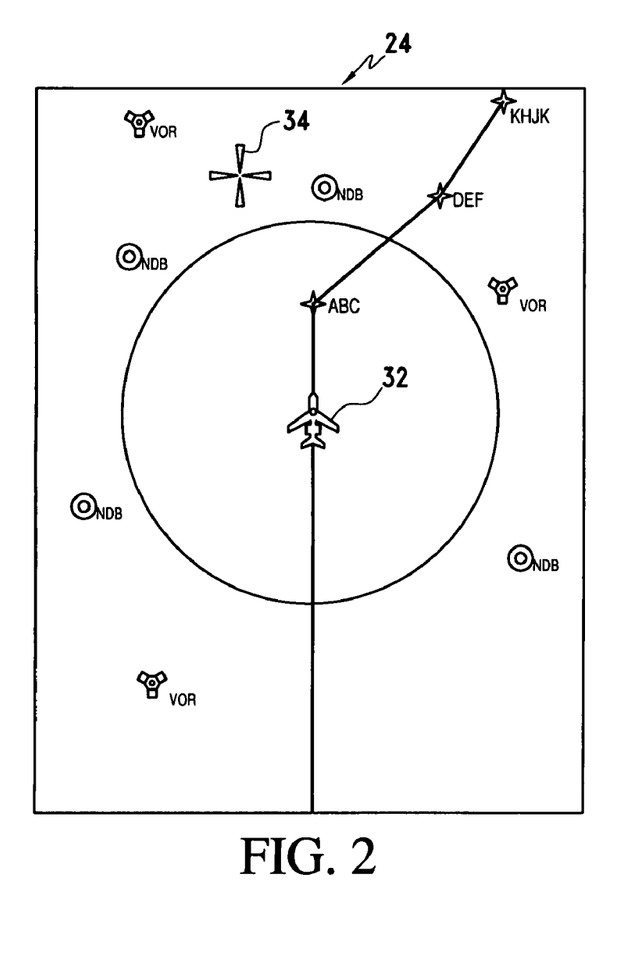
FIG. 2 illustrates a flight display showing an electronic map where an aircraft is flying a flight plan route and presenting a cursor for providing changes in the graphical object positioning mode.

Referring now to FIGS. 2-9 illustration of the principles of the present invention for providing offset graphical flight planning operations is illustrated. In FIG. 2, an electronic display 24 is illustrated showing an aircraft 32 heading toward waypoints ABC, DEF, and KHJK. The display includes a cursor 34 that can be positioned via a coarse positioning input control element, typically a joystick.

Figure 3:
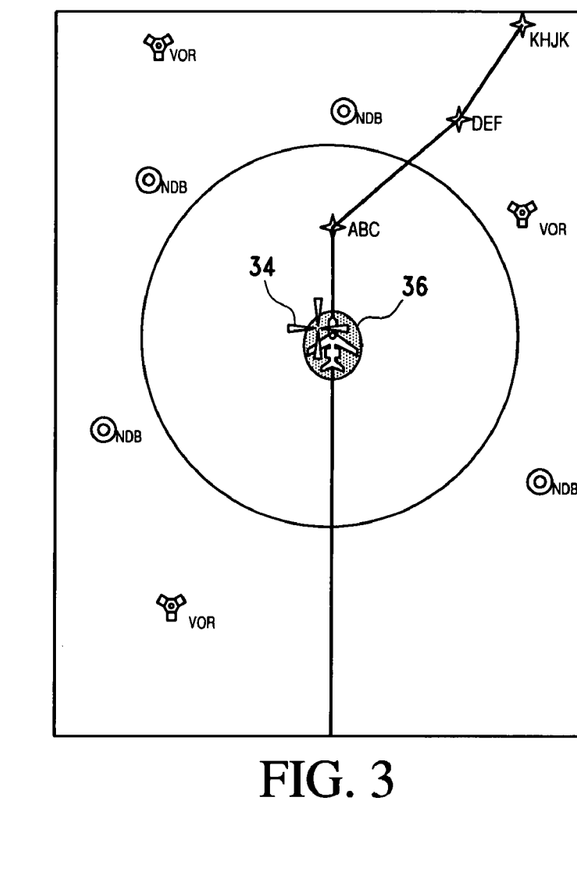
FIG. 3 shows a first step in performing a flight plan edit by slewing the cursor over the aircraft object and highlighting this region which brings a graphical flight planning task menu into view.
Figure 4:
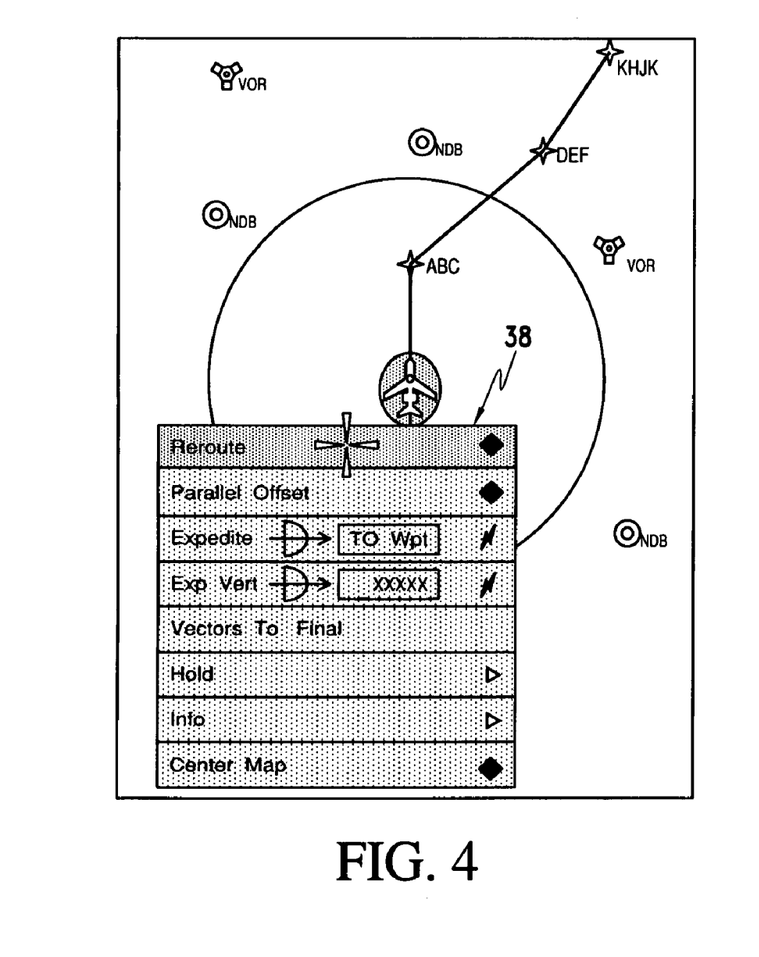
FIG. 4 shows the presentation of this graphical flight planning task menu into view on the display.
Figure 5:
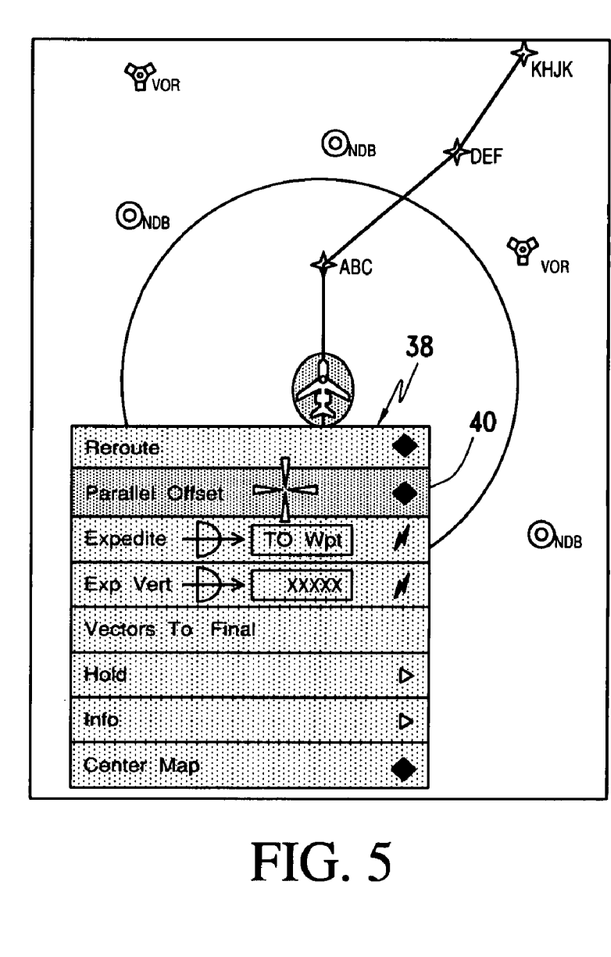
FIG. 5 shows a cursor positioned at a Parallel Offset task region of interest to highlight this region and select the Parallel Offset task.
Figure 6:
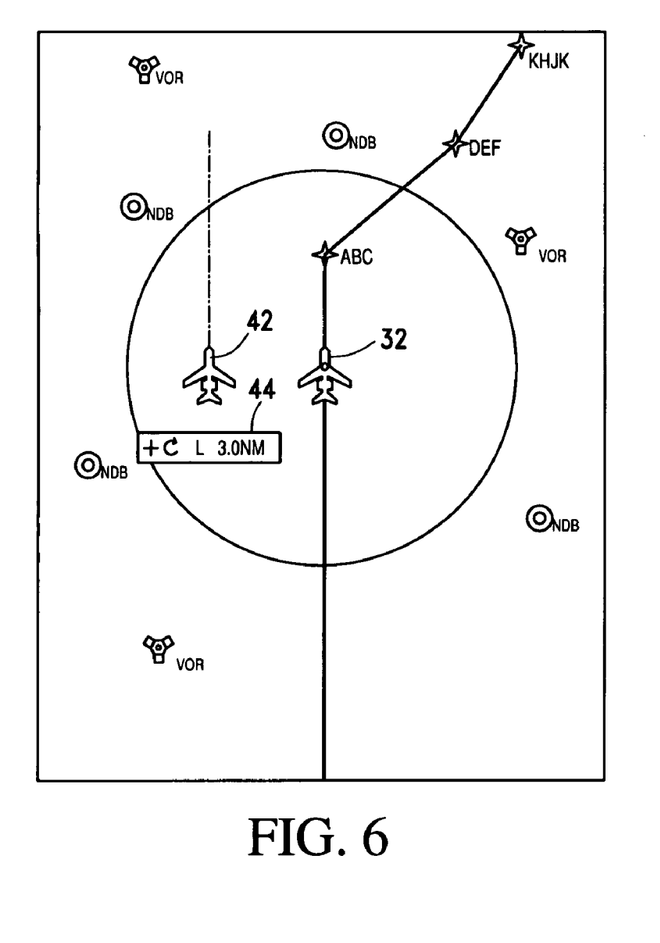
FIG. 6 shows the resultant presentation of an aircraft ghost symbol and coarse positioning thereof.
Figure 7:
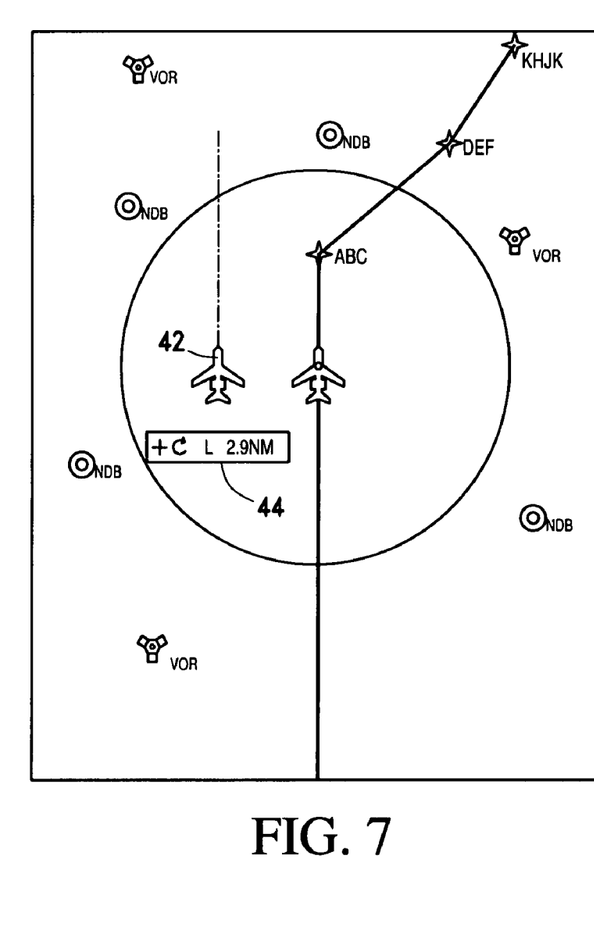
FIG. 7 shows fine positioning of this ghost symbol.
Figure 8:
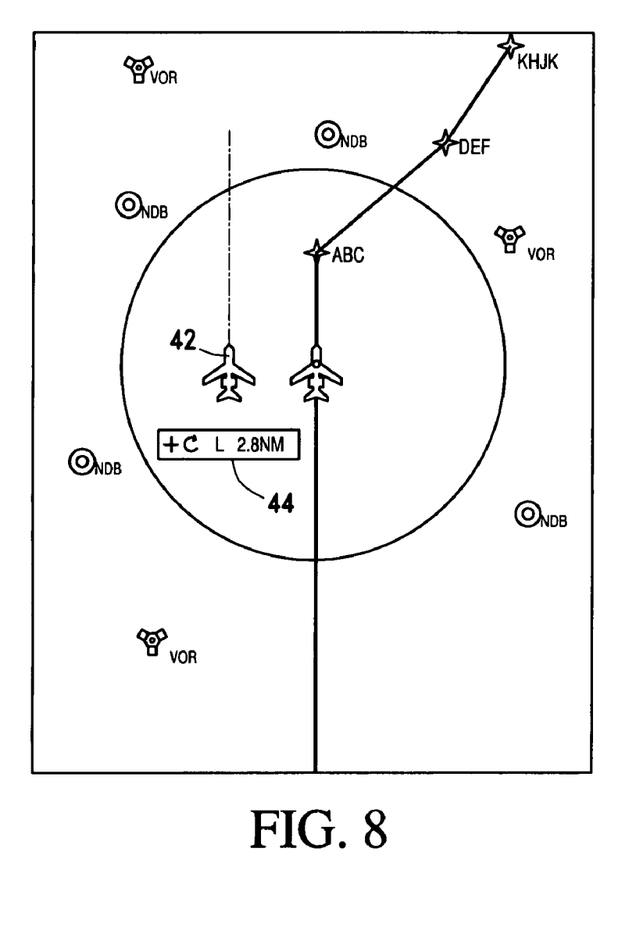
FIG. 8 shows completion of this fine positioning.
Figure 9:
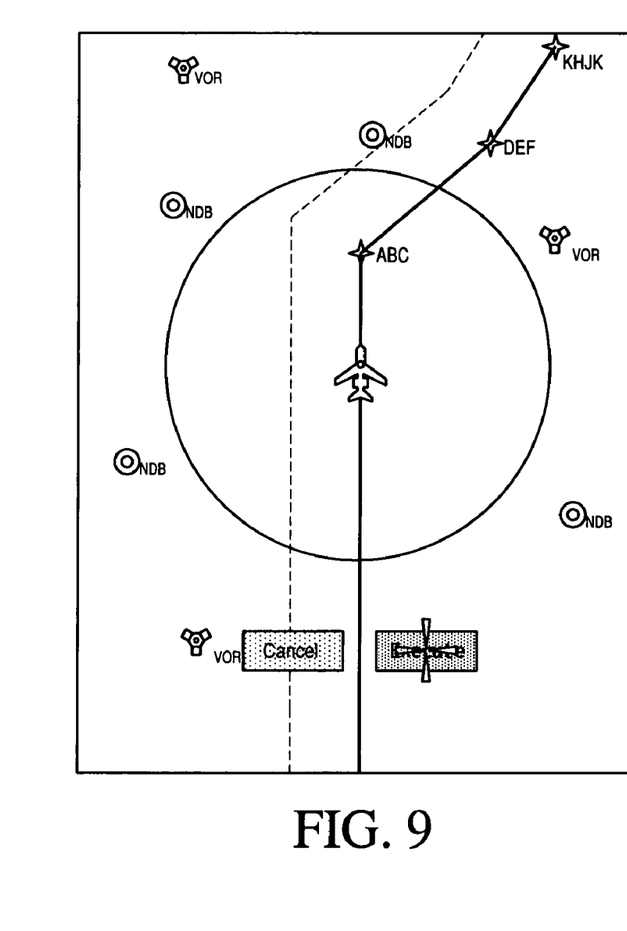
FIG. 9 illustrates execution of the flight plan modification.

In FIG. 3 the cursor 34 is positioned in the region 36 of the aircraft to highlight this region 36. The pushbutton on the joystick can be used to bring the aircraft task menu 38 into view (as shown in FIG. 4). As shown in FIG. 5 the cursor is stewed over the Parallel Offset task 40 thus highlighting this task. The pushbutton is used to select this task. As shown in FIG. 6, this provides an aircraft ghost symbol 42. In this example the coarse positioning input control element, e.g. joystick is used first to rapidly position the symbol 42 and the digital readout to 3 NM left. Then, as shown in FIGS. 7 and 8, a fine positioning input control element, e.g. rotary knob, is used to fine tune the desired position by repositioning the symbol in 0.1 NM increments to the desired setting of 2.8 NM. The pushbutton is used to complete the parallel offset positioning task, as shown in FIG. 9. The pushbutton is depressed a second time after the cursor is prepositioned over the Execute button to execute the flight plan modification.

Figure 10:
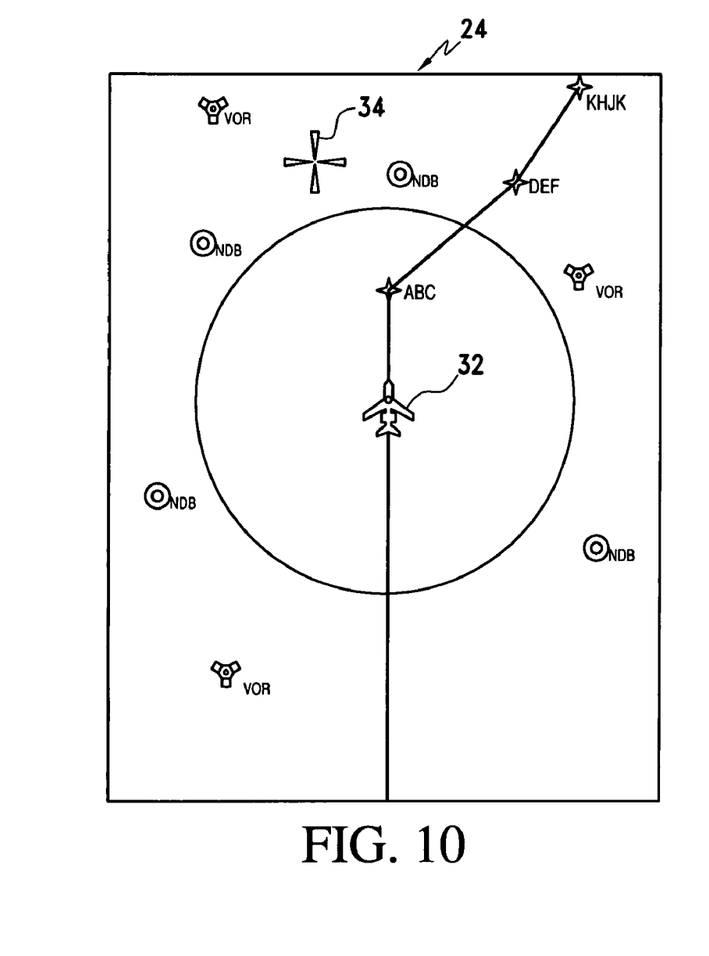
FIG. 10 illustrates a second example where a flight display showing an electronic map where an aircraft is flying a flight plan route and presenting a cursor for providing changes in the graphical object positioning mode.

Referring now to FIGS. 10-16, illustration of the principles of the present invention for providing graphical flight planning operations to insert a pilot defined waypoint is illustrated. In FIG. 10, an electronic display 24 is illustrated showing an aircraft 32 heading toward waypoints ABC, DEF, and KHJK. The display includes a cursor 34 that can be positioned via a coarse positioning input control element, typically a joystick.

Figure 11:
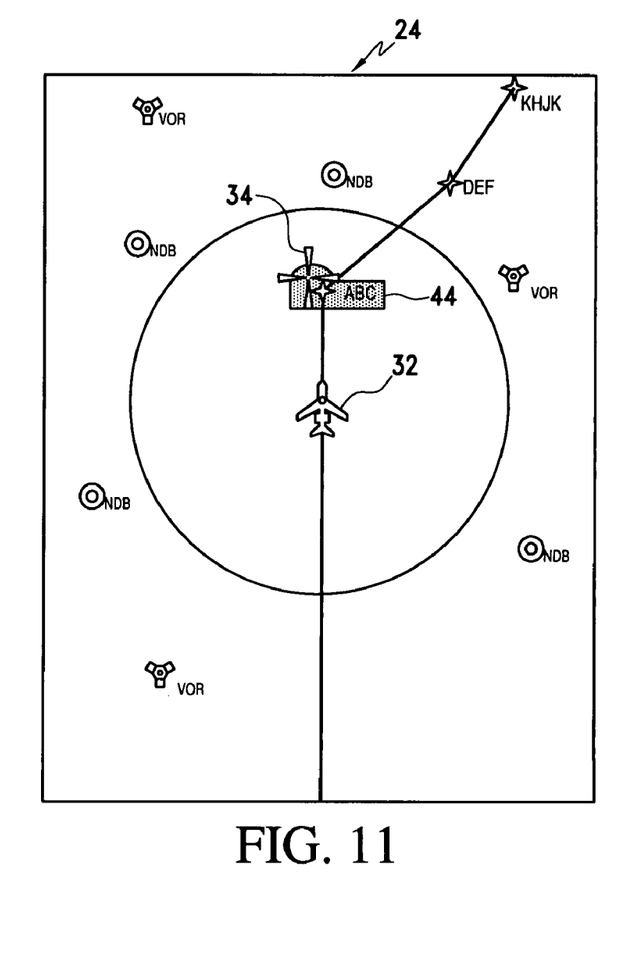
FIG. 11 shows a first step in performing another type of flight plan edit by slewing the cursor over a flight plan waypoint object and highlighting this region which brings a graphical flight planning task menu into view.
Figure 12:
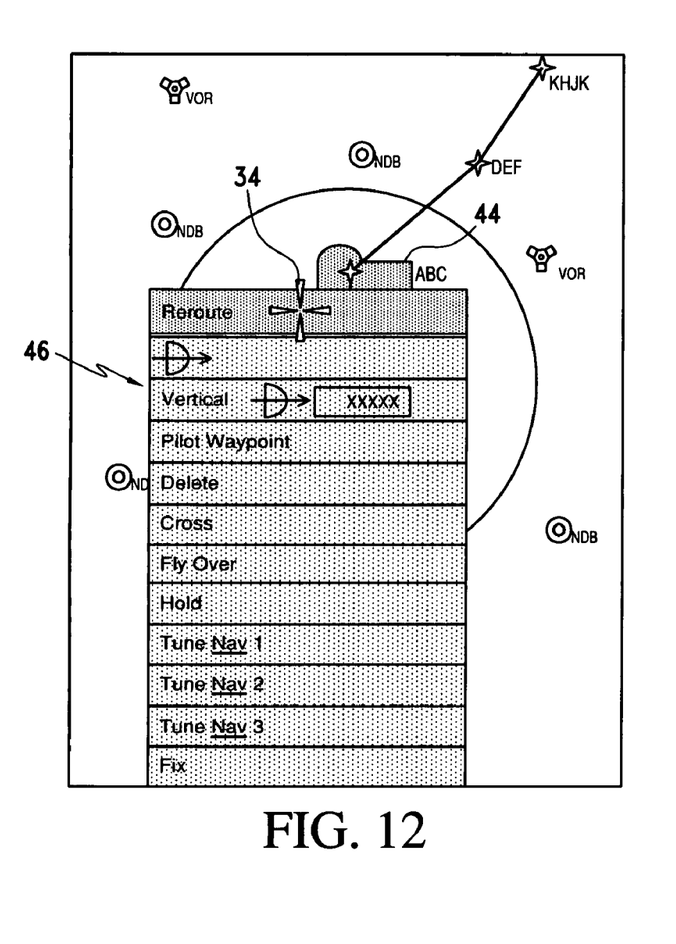
FIG. 12 shows the presentation of this graphical flight planning task menu into view on the display.
Figure 13:
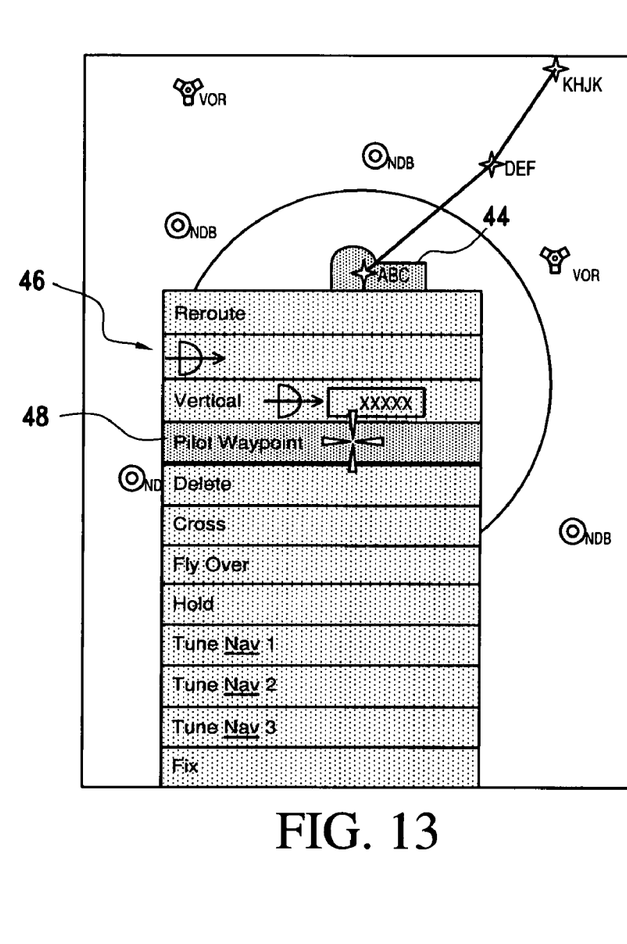
FIG. 13 shows a cursor positioned at the Pilot Waypoint task region of interest to highlight this region and select the Pilot Waypoint task.
Figure 14:
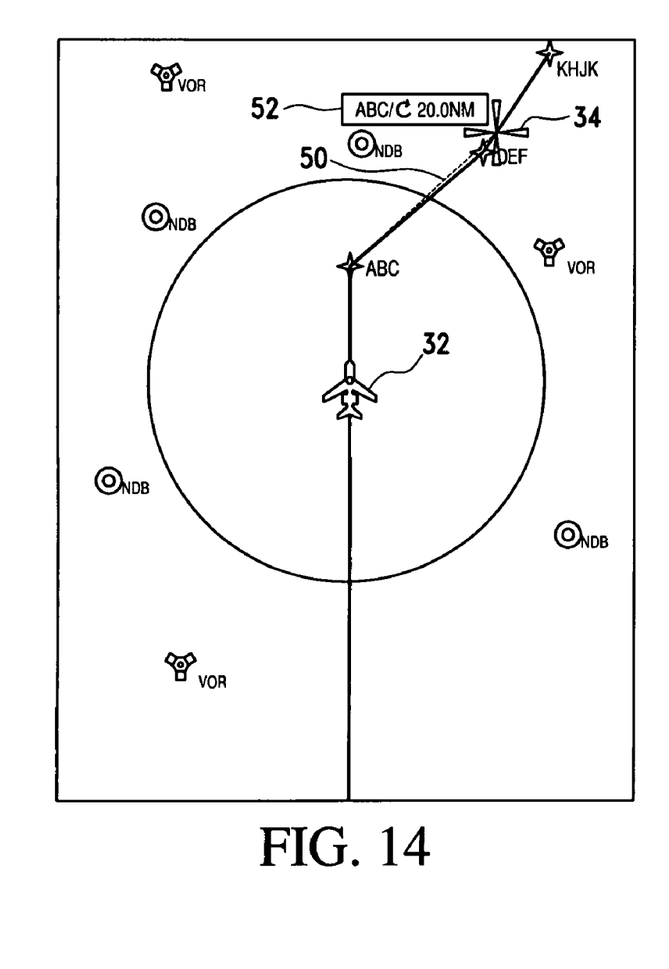
FIG. 14 shows the resultant presentation of the cursor, cursor drag line, digital readout and coarse positioning thereof.
Figure 15:
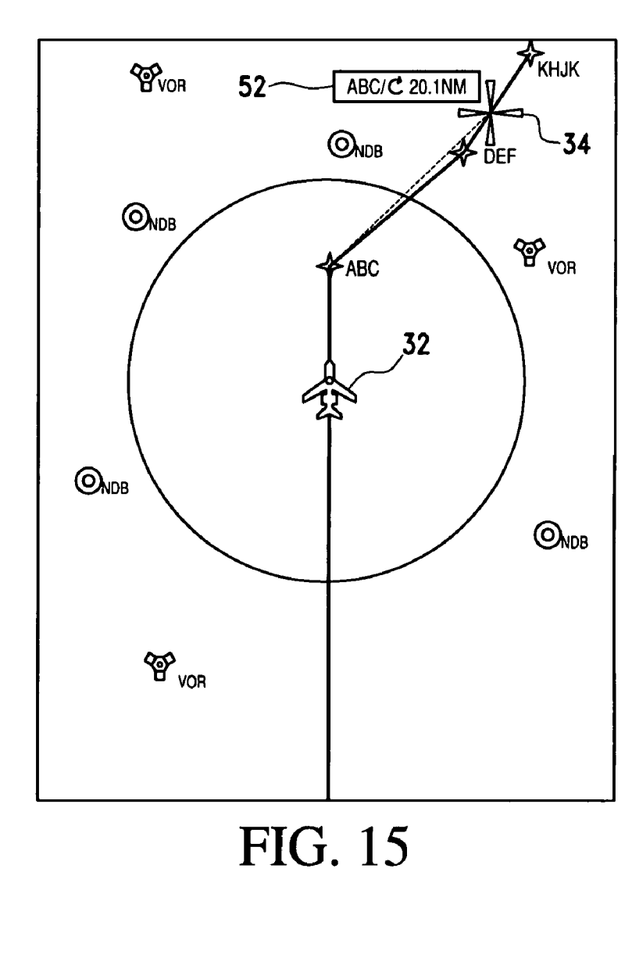
FIG. 15 shows the fine positioning of the cursor, cursor drag line and digital readout symbology.
Figure 16:
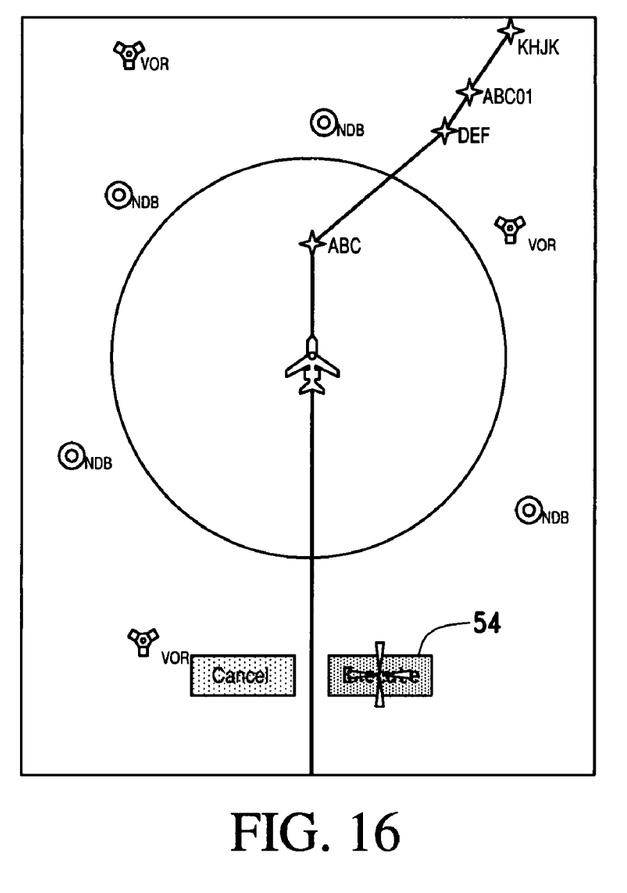
FIG. 16 illustrates execution of the resultant flight plan modification.

In FIG. 11 the cursor 34 is positioned in the region 44 of waypoint ABC to highlight this region 44. The pushbutton on the joystick can be used to bring the waypoint task menu 46 into view (as shown in FIG. 12). As shown in FIG. 13 the cursor is slewed over the Pilot Waypoint task 48, thus highlighting this task. The pushbutton is used to select this task. As shown in FIG. 14, the coarse positioning input control element, e.g. joystick, is used first to rapidly position the cursor 34, cursor dragline 50 and the digital readout 52 to ABC/20 NM down track from waypoint ABC. Then as shown in FIG. 15, a fine positioning input control element, e.g. rotary knob, is used to fine tune the desired position by repositioning the cursor 34 and associated symbology in 0.1 NM increments to the desired setting of 20.1 NM. The pushbutton is used to complete the pilot defined waypoint task, as shown in FIG. 16. The pushbutton would then be depressed a second time after the cursor is prepositioned over the Execute button 54 to execute the flight plan modification.

Other embodiments and configurations may be devised without departing from the spirit of the invention and the scope of the appended claims.

The invention claimed is:

1. An avionics system for positioning a graphical object on an electronic display, comprising:
   a) a coarse positioning input control element for providing a coarse position input signal, said coarse positioning input control element being selected from a group consisting of: joysticks, trackballs, touch pads, and mice;
   b) a fine positioning input control element for providing a fine position input signal, said fine positioning input control element being selected from a group consisting of: rotary knobs, scroll wheels, rocker switches, and pushbuttons; and,
   c) a microprocessor directly connected to said coarse positioning input control element and directly connected to said fine positioning input control element, said microprocessor for integrating said coarse position input signal and said fine position input signal, and providing a microprocessor output signal to the electronic display,
   wherein manipulation of said coarse positioning input control element provides a rapid and coarse manual positioning of the graphical object and manipulation of said fine positioning input control element provides accurate incremental positioning of the graphical object anywhere on the electronic display, thereby optimizing the efficiency for graphical object positioning on the electronic display; and,
   d) a control switch operatively connected to said microprocessor for engaging a graphical object positioning mode, wherein said coarse positioning input control element and said fine positioning input control element can be used to interchangeably position said graphical object, said control switch also capable of disengaging said graphical object positioning mode,
   wherein,
   i) said graphical object is positionable by said coarse positioning input control element over a defined region to highlight this region in an initial step of a graphical flight planning operation;
   ii) said control switch is used to bring a task menu into view related to said highlighted region, providing a plurality of tasks;
   iii) said coarse positioning input control element is used to slew said graphical object over a desired task to highlight a selected task;
   iv) said control switch is used to select said highlighted task and engage said graphical object positioning mode related to said flight planning operation wherein both said coarse positioning and said fine positioning input control elements are engageable in said graphical object positioning mode to provide desired positioning of said graphical object; and,
   v) manipulation of said control switch completes said task.

2. The system of claim 1, further comprising the electronic display operatively connected to said microprocessor.

3. The system of claim 1, wherein said coarse positioning input control element, said fine positioning input control element, and said microprocessor are located on a single device.

4. The system of claim 1, wherein said coarse positioning input control element and said fine positioning input control element may be used interchangeably to efficiently yet accurately position a graphical object at a desired display location.

5. The system of claim 1, further comprising an electronic flight display operatively connected to said microprocessor.

6. An avionics system for positioning a graphical object, comprising:
   a) a coarse positioning input control element for providing a coarse position input signal, said coarse positioning input control element being selected from a group consisting of: joysticks, trackballs, touch pads, and mice;
   b) a fine positioning input control element for providing a fine position input signal, said fine positioning input control element being selected from a group consisting of: rotary knobs, scroll wheels, rocker switches, and pushbuttons;
   c) a microprocessor directly connected to said coarse positioning input control element and directly connected to said fine positioning input control element, said microprocessor for integrating said coarse position input signal and said fine position input signal, and providing a microprocessor output signal; and,
   d) an electronic flight display for receiving said microprocessor output signal,
   wherein manipulation of said coarse positioning input control element provides a rapid and coarse manual positioning of the graphical object and manipulation of said fine positioning input control element provides accurate incremental positioning of the graphical object anywhere on the electronic display, thereby optimizing the efficiency for graphical object positioning on the electronic display; and,
   e) a control switch operatively connected to said microprocessor for engaging a graphical object positioning mode, wherein said coarse positioning input control element and said fine positioning input control element can be used to interchangeably position said graphical object, said control switch also capable of disengaging said graphical object positioning mode,
   wherein,
   i) said graphical object is positionable by said coarse positioning input control element over a defined region to highlight this region in an initial step of a graphical flight planning operation;
   ii) said control switch is used to bring a task menu into view related to said highlighted region, providing a plurality of tasks;

iii) said coarse positioning input control element is used to slew said graphical object over a desired task to highlight a selected task;

iv) said control switch is used to select said highlighted task and engage said graphical object positioning mode related to said flight planning operation wherein both said coarse positioning and said fine positioning input control elements are engageable in said graphical object positioning mode to provide desired positioning of said graphical object; and, v) manipulation of said control switch completes said task.

7. The system of claim 6, wherein said coarse positioning input control element and said fine positioning input control element are used to provide graphical flight planning operations.

8. The system of claim 6, wherein said coarse positioning input control element and said fine positioning input control element are used to provide graphical flight planning operations selected from a group consisting of: parallel offset and pilot defined waypoint generation.

9. A method for positioning a graphical object on an electronic display, comprising the steps of:

a) utilizing a coarse positioning input control element for providing a coarse position input signal for a rapid and coarse manual positioning of the graphical object on the electronic display, said coarse positioning input control element being selected from a group consisting of: joysticks, trackballs, touch pads, and mice; and, b) utilizing a fine positioning input control element for providing a fine position input signal for relatively accurate incremental positioning of said graphical object on the electronic display, said coarse positioning input control element and said fine positioning input control element each being directly connected to a microprocessor for providing a microprocessor output signal to the electronic display, said fine positioning input control element being selected from a group consisting of: rotary knobs, scroll wheels, rocker switches, and pushbuttons; and, c) utilizing a control switch operatively connected to said microprocessor for engaging a graphical object positioning mode, wherein said coarse positioning input control element and said fine positioning input control element can be used to interchangeably position said graphical object anywhere on the electronic display, said control switch also capable of disengaging said graphical object positioning mode, wherein said method for positioning said graphical object is further defined by the steps of:

i) positioning said graphical object, utilizing said coarse positioning input control element, over a defined region to highlight this region in an initial step of a graphical flight planning operation;

ii) utilizing said control switch to bring a task menu into view related to said highlighted region, thus providing a plurality of tasks;

iii) slewing said graphical object a desired task to highlight a selected task, utilizing said coarse positioning input control element;

iv) selecting said highlighted task utilizing said control switch thus engaging said graphical object positioning mode related to said flight planning operation wherein both said coarse positioning and said fine positioning input control elements are engageable in said graphical object positioning mode to provide desired positioning of said graphical object; and, v) manipulating said control switch to complete said task.

10. The method of claim 9, wherein said step of utilizing a coarse positioning input control element and a fine positioning input control comprises implementing graphical flight planning operations as part of an avionics system, said graphical flight planning operations selected from a group consisting of: parallel offset and pilot defined waypoint generation.

* * * * *